United States Patent
Poster

(10) Patent No.: US 10,435,136 B2
(45) Date of Patent: Oct. 8, 2019

(54) DRIVESHAFT THERMAL BARRIER

(71) Applicant: Bell Helicopter Textron Inc., Fort Worth, TX (US)

(72) Inventor: Scott David Poster, Arlington, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 364 days.

(21) Appl. No.: 15/434,012

(22) Filed: Feb. 15, 2017

(65) Prior Publication Data

US 2017/0240265 A1    Aug. 24, 2017

Related U.S. Application Data

(60) Provisional application No. 62/297,370, filed on Feb. 19, 2016.

(51) Int. Cl.
| | | |
|---|---|---|
| *B64C 1/40* | (2006.01) | |
| *B64C 27/14* | (2006.01) | |
| *B64C 27/82* | (2006.01) | |

(52) U.S. Cl.
CPC .............. *B64C 1/40* (2013.01); *B64C 27/14* (2013.01); *B64C 27/82* (2013.01)

(58) Field of Classification Search
CPC ............ B64C 1/40; B64C 27/82; B64C 27/14
See application file for complete search history.

(56) References Cited

U.S. PATENT DOCUMENTS

| | | | |
|---|---|---|---|
| 4,609,165 A * | 9/1986 | Logan .................. | B64C 27/006 180/165 |
| 5,107,649 A | 4/1992 | Benson et al. | |
| 6,110,310 A | 8/2000 | Eyhorn et al. | |
| 7,036,531 B2 * | 5/2006 | Manini ................. | F16L 59/065 138/149 |
| 2004/0185203 A1 | 9/2004 | Gregorio | |
| 2006/0272727 A1 | 12/2006 | Dinon et al. | |
| 2014/0248993 A1 * | 9/2014 | Dawidziak ............ | B60K 6/105 477/5 |
| 2015/0069069 A1 | 3/2015 | Hariram | |

FOREIGN PATENT DOCUMENTS

EP        1232361 B1    5/2008

* cited by examiner

*Primary Examiner* — Valentina Xavier
(74) *Attorney, Agent, or Firm* — Patent Capital Group

(57) ABSTRACT

In one embodiment, an apparatus comprises a thermal barrier configured to surround at least a portion of a driveshaft and to protect the driveshaft from heat. The thermal barrier comprises an inner wall forming a cavity in which the driveshaft lies, an outer wall enclosing the inner wall, and a space between the inner wall and the outer wall. The space is evacuated and forms a vacuum.

20 Claims, 7 Drawing Sheets

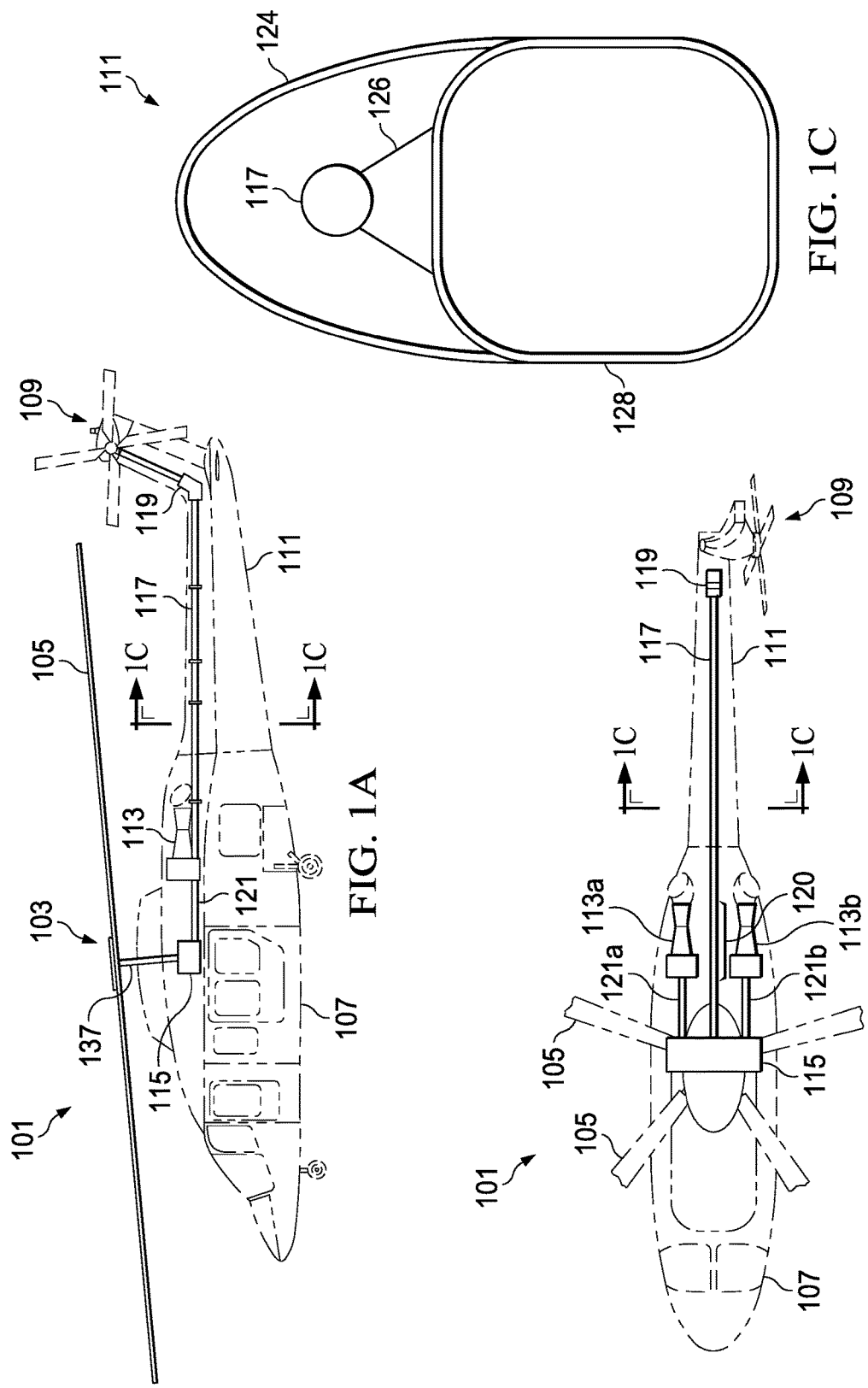

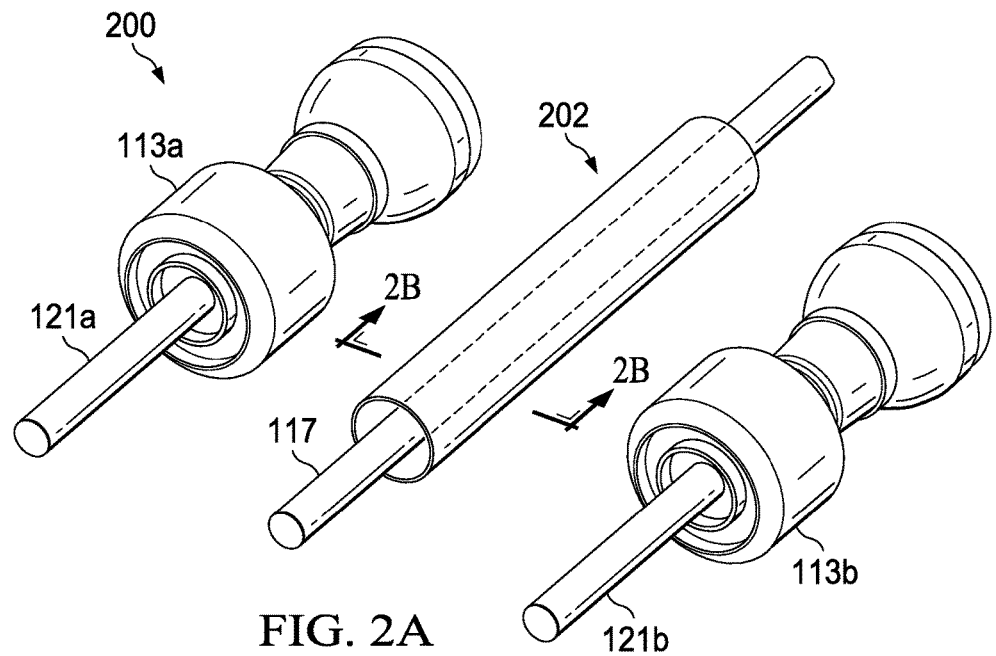
FIG. 2A
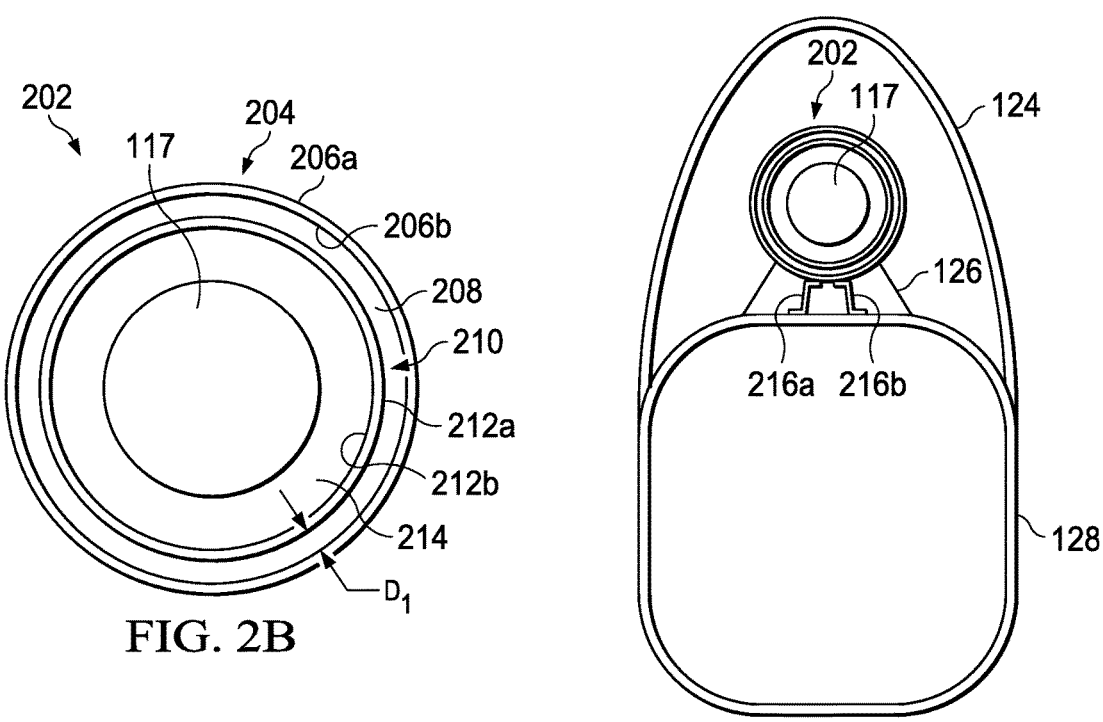
FIG. 2B
FIG. 2C

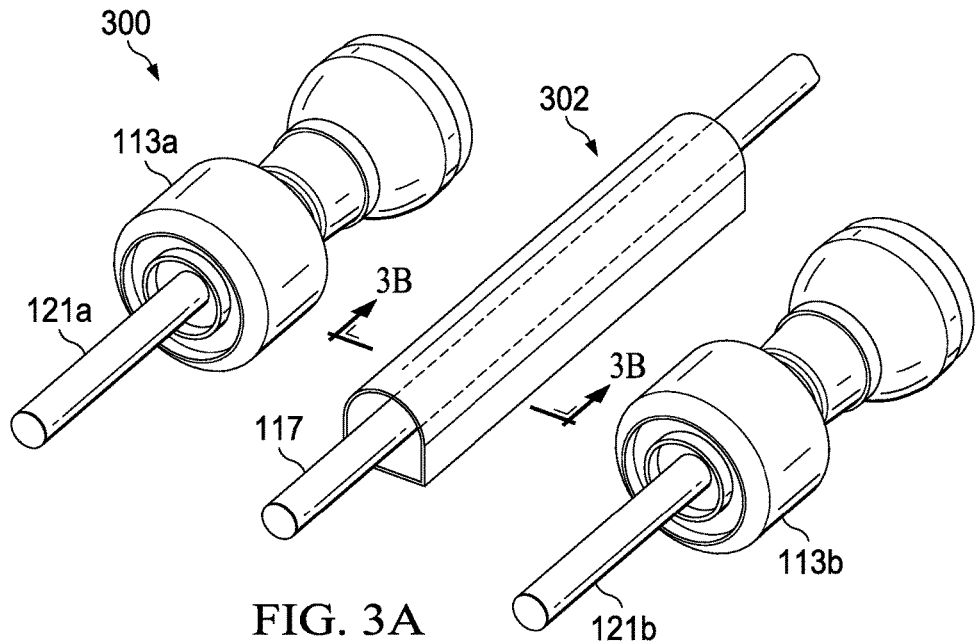
FIG. 3A
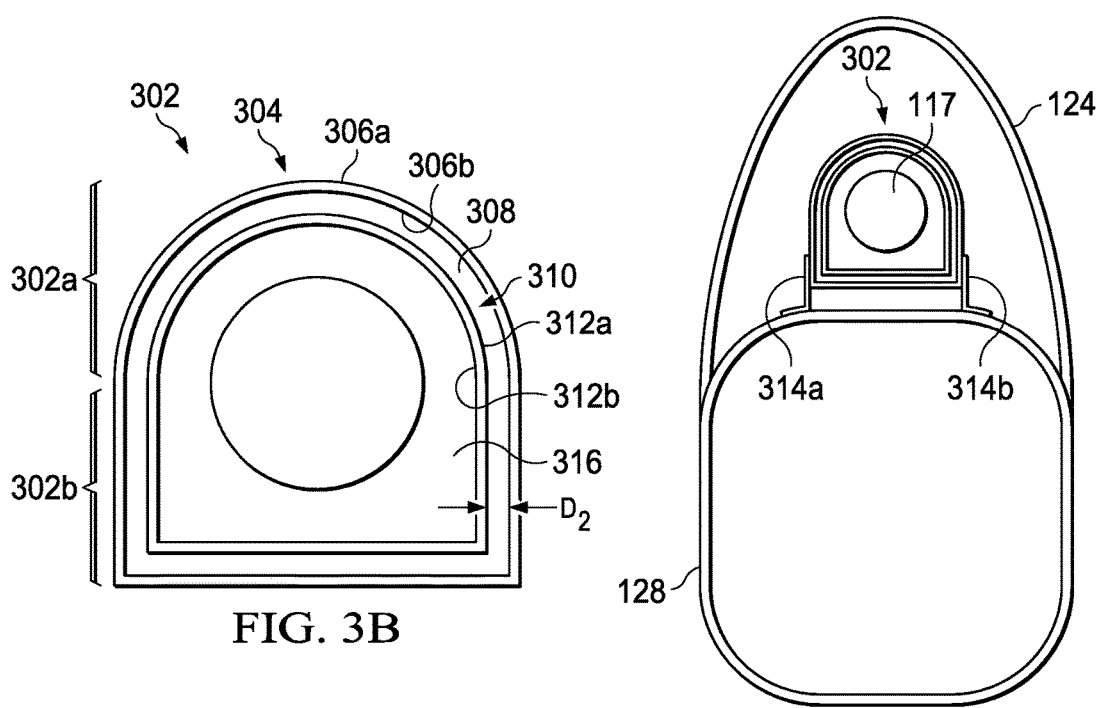
FIG. 3B
FIG. 3C

DRIVESHAFT THERMAL BARRIER

CROSS-REFERENCE TO RELATED APPLICATIONS

This patent application claims the benefit of the filing date of U.S. Provisional Patent Application Ser. No. 62/297,370, filed on Feb. 19, 2016, and entitled "Driveshaft Heat Shield," the content of which is hereby expressly incorporated by reference it its entirety.

TECHNICAL FIELD

This disclosure relates generally to the field of aircraft heat management systems, and more particularly, though not exclusively, to a thermal barrier for drivetrain components.

BACKGROUND

There are many different types of aircraft available for a variety of different purposes. Each aircraft has a drivetrain, which can include an engine, transmission components (e.g., gearboxes), and driveshafts. Each of these components transmits torque to other components to keep the aircraft in flight. Failure of one or more of the drivetrain components could result in serious bodily harm to anyone onboard the aircraft and/or significant damage to the aircraft.

SUMMARY

According to one aspect of the present disclosure, an apparatus comprises a thermal barrier configured to surround at least a portion of a driveshaft and to protect the driveshaft from heat. The thermal barrier comprises an inner wall forming a cavity in which the driveshaft lies, an outer wall enclosing the inner wall, and a space between the inner wall and the outer wall. The space is evacuated and forms a vacuum.

BRIEF DESCRIPTION OF THE DRAWINGS

FIGS. 1A, 1B, and 1C illustrate various views of a rotorcraft in accordance with certain embodiments.

FIGS. 2A, 2B, 2C, 3A, 3B, and 3C illustrate a portion of a rotorcraft protected by a thermal barrier in accordance with certain embodiments.

DETAILED DESCRIPTION

Figure 4A:
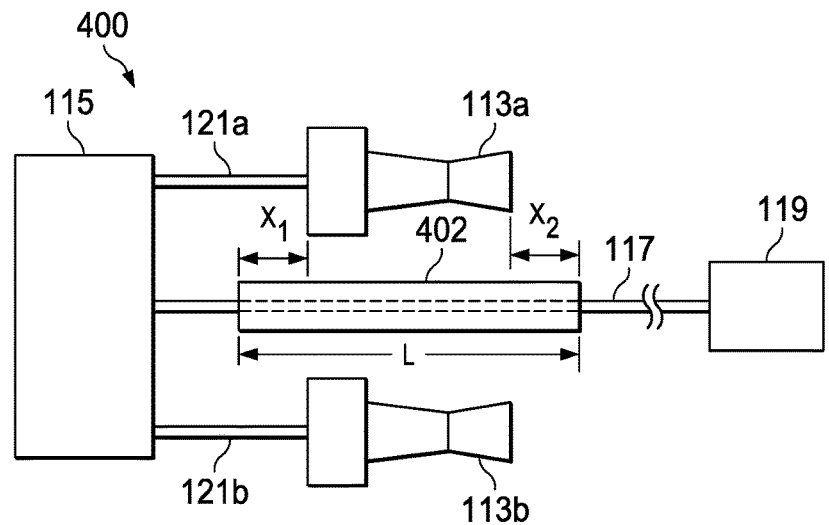
FIGS. 4A, 4B, and 5 illustrate simplified top views of rotorcraft with various configurations of thermal barriers in accordance with certain embodiments.

Illustrative embodiments of the systems, apparatuses, and methods of the present disclosure are described below. It will be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Further, the present disclosure may repeat reference numerals and/or letters in the various examples. This repetition is for the purpose of simplicity and clarity and does not, in itself, dictate a relationship between the various embodiments and/or configurations discussed.

Example embodiments that may be used to implement the features and functionality of this disclosure will now be described with more particular reference to the attached FIGURES.

FIGS. 1A, 1B, and 1C illustrate various views of a rotorcraft 101 in accordance with certain embodiments. FIG. 1A illustrates a side view of the rotorcraft 101 while FIG. 1B illustrates a top view of the rotorcraft 101. FIG. 1C illustrates a cross-section through an empennage of the rotorcraft 101 of FIGS. 1A and 1B.

Referring now to FIGS. 1A and 1B, the rotorcraft 101 has a rotor system 103 with a plurality of rotor blades 105. The pitch of each rotor blade 105 can be managed in order to selectively control direction, thrust, and lift of the rotorcraft 101. Rotorcraft 101 further includes a fuselage 107, anti-torque system 109, and an empennage 111. Torque is supplied to each of the rotor system 103 and the anti-torque system 109 from one or more of engines 113 (i.e., engines 113a and 113b of FIG. 1B) via one or more gearboxes and driveshafts. In particular, torque is supplied from the engines 113a and 113b to a main rotor mast 137 (i.e., to rotate the rotor blades 105 of rotor system 103) via engine main output driveshafts 121 (i.e., driveshafts 121a and 121b of FIG. 1B) and the gearbox 115. In addition, torque is supplied from the engines 113a and 113b to the anti-torque system 109 (i.e., to rotate the blades of the anti-torque system 109) via tail rotor driveshaft 117 and the gearbox 119. A section line (labelled "1C") through the empennage 111 in FIGS. 1A and 1B identifies the viewpoint of the cross-section of FIG. 1C.

In the example of the rotorcraft 101, the tail rotor driveshaft 117 is located between the engines 113a and 113b. In the event that one or more of the engines 113a and 113b catches fire, the tail rotor driveshaft 117 may be susceptible to damage caused by the engine fire. Specifically, area 120 (as labeled in FIG. 1B) is an area of driveshaft 117 that is most susceptible to damage caused by an engine or fuel fire because of its proximity to the engines 113a and 113b.

Turning to FIG. 1C, FIG. 1C illustrates a cross-section through the empennage 111 of the rotorcraft 101. The cross-section cuts through the driveshaft 117 of FIGS. 1A and 1B, among other things. The cross-section shows relationships between components of the empennage 111. The empennage 111 comprises a tailboom 128, the driveshaft 117, a hanger bearing assembly 126, and a driveshaft cover 124. The tailboom 128 includes structural members that support the other components of the empennage 111. The hanger bearing assembly 126 is attached to a top of the tailboom 128 and supports the driveshaft 117. While only one hanger bearing assembly is visible in the cross-section of FIG. 1C, the tailboom 128 includes multiple hanger bearing assemblies along its length. The driveshaft cover 124 attaches to the tailboom 128 to cover the driveshaft 117. The driveshaft cover 124, at least in part, protects the driveshaft 117 from environmental conditions (e.g., water, debris, and the like).

During normal operation of a rotorcraft (e.g., rotorcraft 101), the rotorcraft's engine generates heat, which can radiate to other components of the rotorcraft. In extreme cases, an engine may catch fire and expose other components of the rotorcraft to extreme heat from the fire, which can degrade the performance of these other components. Because the driveshafts 117, 121a, and 121b transmit torque from the engines 113a and 113b to other operational components of the rotorcraft 101, it is critical that the driveshafts remain structurally sound and capable of transferring the torque without failure. For example, the driveshafts 121a, 121b, and 117 transmit torque between the engines 113a and 113b, and the rotor system 137 and anti-torque system 109 via one or more gearboxes 115, 119. However, in the case of a fire in one or more of the engines 113a and 113b, the driveshafts may be exposed to temperatures that exceed the temperature at which an aluminum or composite driveshaft may lose its mechanical strength, which may be about 300° F. Furthermore, certain fuel used by the engines can cause a fire to burn at temperatures that exceed 1500° F. Depending on the material from which the driveshafts are made, the driveshafts may or may not—when exposed to such temperatures—lose their ability to transmit the requisite torque to keep the rotorcraft 101 operational. In some examples, the driveshafts fail (e.g., by melting, permanently deforming, losing torsional stiffness, etc.) due to heat from a fire in close proximity or on the engines 113a and 113b. For example, the tail rotor driveshaft 117 may fail when it reaches a temperature equal to or above about 300° F. Failure of the driveshaft 117 while the rotorcraft 101 is in flight could result in serious bodily harm to anyone onboard the rotorcraft 101 and/or significant damage to the rotorcraft 101. Thus, it is critical that the driveshaft 117 remain capable of transmitting torque from the engines 113a and 113b during and after exposure to a fire.

A technical challenge is to maintain the mechanical strength and integrity of driveshafts during and after a fire. One possible solution is to make the driveshafts from "high-temperature" materials (e.g., steel, titanium), which are resistant to extremes temperatures. That is, driveshafts made from these materials may continue to transmit torque after exposure to temperatures up to or beyond about 500° F. However, some of these high-temperature materials can be very heavy and—due to the weight that they add to the rotorcraft 101—can reduce the overall operational efficiency of the rotorcraft 101. Moreover, some of the high-temperature materials are relatively expensive and/or commercially unavailable in the sizes (e.g., titanium is not available in large diameter tubes) needed for this application. Alternatively, driveshafts may be made of a lightweight material such as aluminum, carbon fiber, fiber glass, and/or composite materials, which are efficient with respect to transmitting torque and are lighter than steel and some other high-temperature materials (e.g., for a given volume of material). However, when exposed to high temperatures from fire, these lightweight materials lose their ability to transmit the requisite torque to keep the rotorcraft 101 operational (e.g., airborne, in flight). Thus, a secondary challenge is to keep the driveshaft lightweight, in addition to the above technical challenge. A possible solution is to make the driveshafts from a lightweight material (but is not a high-temperature material) and to insulate the driveshafts from extreme heat. Insulation systems may include wrapping the driveshafts with a thermal blanket. Some insulation systems included thermal blankets (e.g., made from foamed metal). Such a thermal blanket may, in the example, of FIGS. 1A-C, be placed between the heat source (e.g., the engines 113a and 113b) and the driveshaft 117. For example, the thermal blanket can be attached to an airframe of the rotorcraft 101. However, thermal blankets add additional weight to the rotorcraft 101. In addition, some thermal blankets consume significant space due to a thickness of the blanket. These thermal blankets may be too bulky for some situations. Thus, a third challenge is to keep any heat protection system relatively lightweight and thin to conserve space on the rotorcraft 101 and meet performance requirements.

The systems, apparatuses, and thermal barriers described in the present disclosure address each of the three challenges discussed above (as well as other challenges). For example, a thermal barrier, as disclosed herein, may include a design that is lightweight, compact, and itself heat-resistant (e.g., a metal-walled vacuum chamber). The thermal barrier may form a vacuum to shield heat from reaching a drivetrain component (e.g., driveshaft, gearbox, transmission system, and the like). "Shielding" (i.e., to "shield"), as referred to herein, can include (among other things) protecting, shielding, redirecting, deflecting, absorbing, dissipating, stopping and/or otherwise controlling thermal energy from reaching an interior of a thermal barrier. Vacuum is an efficient approach to insulating thermal energy because thermal energy is not transmitted (and/or is substantially reduced) across a vacuum. The thermal barrier can include a number of walls that form a chamber that is evacuated to create a vacuum chamber. In addition, vacuum space is lightweight and does not consume as much space as a thermal blanket (e.g., for the same insulative value). The thermal barrier is configured such that thermal energy is not transmitted (and/or is substantially reduced) from one wall of the thermal barrier, through a vacuum chamber, to another wall of the thermal barrier.

For example, the outermost surface of a thermal barrier may be at a temperature of about 500° F. However, the vacuum chamber shields an interior cavity of the thermal barrier from the elevated temperature and, as a result, an innermost surface of the thermal barrier reaches only a temperature of about 250° F. (e.g., a reduction of about 50% relative to the temperature at the outermost surface). In another example, the outermost surface of a thermal barrier may be at a temperature of about 500° F., while the innermost surface of the thermal barrier reaches only a temperature of about 125° F. (e.g., a reduction of about 75% relative to the temperature at the outermost surface). In another example, the outermost surface of a thermal barrier may be at a temperature of about 1000° F., while the innermost surface of the thermal barrier reaches only a temperature of about 100° F. (e.g., a reduction of about 90% relative to the temperature at the outermost surface). One of ordinary skill in the art will readily appreciate that the performance of any particular thermal barrier will depend on a variety of factors, including at least the specific design and configuration of the thermal barrier.

Such a thermal barrier addresses the technical challenges by shielding the drivetrain component from fire and/or high temperatures and, thereby, maintains the structural integrity of the drivetrain component during and after being exposed to fire and/or high temperatures. In addition, the combination of the light weight of the material and the vacuum keeps the thermal barrier both light and thin. Moreover, the protection provided by the thermal barrier allows the drivetrain component to be made from a material that would otherwise lose its ability to transmit the requisite torque when exposed to high temperatures from fire. Advantageously, lightweight materials (e.g., aluminum, carbon fiber, or composite materials) may be used since they are protected by the thermal barrier. In some examples, the thermal barrier may enable the selection of a material other than steel for the drivetrain component. The thermal barrier protects the drivetrain components, which may improve safety, reliability, and fatigue life of the drivetrain components.

As an example, a rotorcraft, as disclosed herein, can comprise: an engine, a drivetrain component operably coupled to the engine, and an evacuated thermal barrier surrounding at least a portion of the drivetrain component. In another example, an apparatus comprises: a thermal barrier surrounding at least a portion of a drivetrain component and protecting the drivetrain component from heat. The thermal barrier comprises: an inner wall forming a cavity in which the drivetrain component lies, an outer wall enclosing the inner wall, and a space between the inner wall and the outer wall, wherein the space is evacuated and forms a vacuum. In another example, a method comprises: receiving, at an outmost surface of a thermal barrier, a first temperature; shielding, by a vacuum in the thermal barrier, a drivetrain component enclosed by an innermost surface of the thermal barrier from the first temperature, wherein the drivetrain component receives a second temperature that is less than the first temperature.

It should be appreciated that rotorcraft 101 is merely illustrative of an aircraft for with which the system of the present disclosure can be implemented. Other aircraft implementations can include, for example, fixed wing airplanes, tiltrotors, hybrid aircraft, unmanned aircraft, gyrocopters, single engine aircraft, and a variety of helicopter configurations, among other examples. Moreover, it should be appreciated that even though aircraft are particularly well suited to implement embodiments of the present disclosure, the described embodiments can also be implemented using non-aircraft vehicles and devices. Further, any vehicle having a drivetrain can utilize the system of the present disclosure, such as, tanks, hovercraft, and automobiles.

FIGS. 2A, 2B, 2C, 3A, 3B, and 3C illustrate a portion of a rotorcraft protected by a thermal barrier in accordance with certain embodiments.

Turning to FIGS. 2A, 2B, and 2C, FIGS. 2A, 2B, and 2C illustrate, among other things, a system 200 in which a cylindrical thermal barrier 202 surrounds a portion of a driveshaft within a rotorcraft. FIG. 2A is an isometric view of the system 200; FIG. 2B is a cross-section of the thermal barrier 202; and FIG. 2C is another a cross-section that illustrates the thermal barrier 202 in the context of an empennage 111 of the rotorcraft.

Turning to FIG. 2A, in addition to the thermal barrier 202, the system 200 comprises engines 113a and 113b, main driveshafts 121a and 121b, and tail rotor driveshaft 117. Each of these components is operably coupled to others of the components. The engines 113a and 113b generate torsional forces and transmit the torque to each system component in series. For example, the engines 113a and 113b are connected to driveshafts 121a and 121b, respectively. Each engine turns (i.e., applies a torsional force to) its respectively coupled driveshaft. In turn, the driveshafts 121a and 121b transmit torque from the engines 113a and 113b to a main gearbox (not shown in FIG. 2A). The main gearbox transmits the torque from the driveshafts 121a and/or 121b to the driveshaft 117. The driveshaft 117 transmits the torque from the main gearbox to an anti-torque system (not shown in FIG. 2A). Thus, the driveshaft 117 is operably coupled to the engines 113a and 113b via the main gearbox and the main driveshafts 121a and 121b.

The driveshaft 117 extends between the engines 113a and 113b. If either (or both) of the engines 113a and 113b catch fire, a portion of the driveshaft 117 that is proximate the engines 113a and 113b would be susceptible to failure due to the fire. In this example, the thermal barrier 202 surrounds a portion of the driveshaft 117 that is adjacent to the engines 113a and 113b. The thermal barrier 202 is an evacuated thermal barrier (as will be described further below with respect to FIG. 2B). Each of the engines 113a and 113b is located outside of an outer wall of the thermal barrier 202. A vacuum within the thermal barrier 202 reduces the transmission of thermal energy from an outside of the thermal barrier 202 to an inside of the barrier. Thus, any thermal energy received on the outside of the thermal barrier 202 is dissipated and, at least in part, not transmitted to the inside of the thermal barrier 202. The thermal barrier 202 protects the driveshaft 117 from a fire on one or more of the engines 113a and 113b. For example, in the event of a fire at one of the engines 113a-b, the thermal barrier shields the portion of the driveshaft 117 from receiving extreme temperatures from the fire (and the driveshaft may only experience a temperature much less than that present on the outside of the thermal barrier). A section line (labelled "2B") through the thermal barrier 202 in FIG. 2A identifies the viewpoint of the cross-section of FIG. 2B.

Turning to FIG. 2B, FIG. 2B is a cross-section of the thermal barrier 202 of FIG. 2A. The thermal barrier 202 is a cylinder in overall shape and surrounds the driveshaft 117. The thermal barrier 202 comprises an outer wall 204 and an inner wall 210. The inner wall 210 and outer wall 204 can be made from any metal (or any lightweight and/or heat-resistant material). The outer wall 204 encloses the inner wall 210. The cross sectional shape of each of the outer wall 204 and the inner wall 210 is a circle. The outer wall 204 comprises an outer surface 206a and an inner surface 206b. The inner wall 210 comprises an outer surface 212a and an inner surface 212b. The outer surface 206a of the outer wall 204 is an outermost surface of the thermal barrier 202. The inner surface 212b of the inner wall 210 is an innermost surface of the thermal barrier 202. The inner wall 210 (and, in particular, the inner surface 212b) forms a cavity 214. The driveshaft 117 lies within the cavity 214. The outer wall 204 and the inner wall 210 are separated from one another by an annular space 208. The annular space 208 is gap measuring a distance D1 between the outer surface 212a (of the inner wall 210) and the inner surface 206b (of the outer wall 204). In the example of FIG. 2B, the distance D1 is substantially constant around the entire cross-section of the thermal barrier 202. However, in other examples, the gap is not constant and, instead, varies around the circumference of the thermal barrier 202 (e.g., the gap is wider on the side that face the engines to provide more thermal protection in the potentially hottest zones of a fire).

The annular space 208 is evacuated and forms a vacuum. For example, substantially all air (and/or other gases) are removed from the annular space 208 to create a vacuum between the outer wall 204 and the inner wall 210. The vacuum within the annular space 208, at least in part, shields the driveshaft 117 from heat generated by a fire on one or more of the engines 113a and 113b. Advantageously, the shielding provided by the vacuum in the thermal barrier 202 allows the driveshaft 117 to continue to transmit torque (e.g., to a tail rotor system for keeping the rotorcraft airborne) regardless of the material from which the driveshaft 117 is made. For example, even when the driveshaft 117 is made from a material (e.g., composite materials, carbon fiber, aluminum, fiberglass, or any other non-steel material) that fails to transmit torque when exposed to high temperatures, the thermal barrier 202 shields the driveshaft 117 from excessive heat produced by a fire on the engines 113a and 113b and allows the driveshaft 117 to continue to transmit torque during and after the fire.

The walls (i.e., the inner wall 210 and the outer wall 204) of the thermal barrier 202 can be made from any lightweight and/or heat-resistant material. In some embodiments, the walls of the thermal barrier are titanium, aluminum, or steel. In further embodiments, neither the inner wall nor the outer wall are made of steel (e.g., excludes steel due to the relatively high weight of steel relative to other materials). In still other embodiments, the thermal barrier excludes any metalized foam or thermal blankets (e.g., due to the relatively high thickness of metalized foam and thermal blankets relative to other materials).

In one exemplary operation of the thermal barrier 202, the outer surface 206a of the outer wall 204 receives a temperature of about 600° F. (i.e., a first temperature). The vacuum space 208 shields the cavity 214 and, as a result, also shields the driveshaft 117 (i.e., a drivetrain component) enclosed from excessive temperatures. Instead, the inner surface 212b only receives a temperature of about 250° F. (i.e., a second temperature). In addition, the driveshaft 117 may be maintained at an even lower temperature because an air gap separates driveshaft 117 and inner surface 212b (see FIGS. 2B, 2C). Forced air movement in this gap may further protect driveshaft 117 from elevated temperatures. In this example, the walls 204 and 210 are made of titanium. The shielding provided by the vacuum space 208 provides a reduction of about 58% (i.e., from the first temperature to the second temperatures). In one non-limiting example, the gap is on the order of a few millimeters (e.g., the distance D1 is about 2 or 3 millimeters).

Turning to FIG. 2C, FIG. 2C illustrates a cross-section through an empennage of a rotorcraft protected by the thermal barrier 202. The viewpoint of the cross-section of FIG. 2C corresponds to the viewpoint of the cross-section of FIG. 1C (as depicted by the section lines in FIGS. 1A and 1B through the empennage 111 of the rotorcraft 101). The cross-section of FIG. 2C includes tailboom 128, driveshaft 117, hanger bearing assembly 126, and driveshaft cover 124 as described with respect to FIG. 1C; the description is not repeated here only for the purpose of brevity. In contrast to the cross-section of FIG. 1C, the cross-section of FIG. 2C includes the thermal barrier 202, which surrounds the driveshaft 117. In this example, the thermal barrier 202 extends into the empennage. One or more tabs 216a and 216b are fastened to the outside of the thermal barrier 202. The thermal barrier 202 is supported by the tabs 216a and 216b. The tabs 216a and 216b attach the thermal barrier 202 to the tailboom 128. Each of the tabs 216a and 216b is attached, at one end, to the thermal barrier 202 and, at the other end, to the tailboom 128. The attachment between the tabs and the thermal barrier 202 may be any mechanical attachment (e.g., welding). In some examples the tabs 216a and 216 are formed as part of (are continuous with and integral to) the outer wall 204. In other examples, a strap or ring wraps around the thermal barrier 202 (e.g., gripping the barrier) and the strap or ring is mechanically fastened to the tailboom 128 and/or other components of the airframe (e.g., to eliminate any need to weld or fastening directly to the thermal barrier). In addition, the thermal barrier 202 may be supported, at least in part, by the hanger bearing assembly 126. In this example, the thermal barrier 202 is a standalone part that is added to the rotorcraft 101. However, in other examples, the thermal barrier 202 may be integrated, at least in part, with the empennage 111.

In the example of FIGS. 2A, 2B, and 2C, the thermal barrier 202 is generally cylindrical in shape and has a cross-sectional shape of a circle. However, the embodiments of the present disclosure are not limited to such geometry. For example, the cross-sectional shape of a thermal barrier may be a triangle, a rectangle, an oval, any other shape and/or compound shape (i.e., made from a combination of two or more shapes). For example, a circular shape may be the most generally applicable to driveshafts. However, if the thermal barrier is integrated into the airframe, a compound shape may best fit within the geometric constraints of the airframe. As a further example, FIGS. 3A, 3B, 3C illustrate a thermal barrier that has a compound shape (i.e., a semi-circle atop a rectangle).

Turning to FIGS. 3A, 3B, and 3C, FIGS. 3A, 3B, and 3C illustrate, among other things, a system 300 in which a thermal barrier 302 surrounds a portion of a driveshaft within a rotorcraft. FIG. 3A is an isometric view of the system 300; FIG. 3B is a cross-section of the thermal barrier 302; and FIG. 3C is another a cross-section that illustrates the thermal barrier 302 in the context of an empennage of the rotorcraft. In addition to the thermal barrier 302, the system 300 comprises engines 113a and 113b, main driveshafts 121a and 121b, and tail rotor driveshaft 117. Each of these components is as described with respect to FIG. 2A; the description is not repeated here only for the purpose of brevity.

Turning to FIG. 3A, the driveshaft 117 extends between the engines 113a and 113b. If either (or both) of the engines 113a and 113b catch fire, a portion of the driveshaft 117 that is proximate the engines 113a and 113b would be susceptible to failure due to the fire (e.g., loss of torsional stiffness due to material softening in heat of fire). In this example, the thermal barrier 302 surrounds a portion of the driveshaft 117 that is adjacent to the engines 113a and 113b. The thermal barrier 302 is an evacuated thermal barrier (as will be described further below with respect to FIG. 3B). Each of the engines 113a and 113b is located outside of an outer wall of the thermal barrier 302. A vacuum within the thermal barrier 302 reduces the transmission of thermal energy from an outside of the thermal barrier 302 to an inside of the thermal barrier 302. Thus, any thermal energy received on the outside of the thermal barrier 302 is dissipated and, at least in part, not transmitted to the inside of the thermal barrier 302. The thermal barrier 302 protects the driveshaft 117 from a fire on one or more of the engines 113a and 113b. For example, in the event of a fire at one of the engines 113a and 113b, the thermal barrier 302 shields the portion of the driveshaft 117 from receiving extreme temperatures from the fire (and the driveshaft may only experience a temperature much less than that present on the outside of the thermal barrier 302). A section line (labelled "3B") through the thermal barrier 302 in FIG. 3A identifies the viewpoint of the cross-section of FIG. 3B.

Turning to FIG. 3B, FIG. 3B is a cross-section of the thermal barrier 302 of FIG. 3A. The thermal barrier 302 surrounds the driveshaft 117. A shape of the thermal barrier 302 is a compound shape. The thermal barrier 302 comprises an outer wall 304 and an inner wall 310. The inner wall 310 and outer wall 304 can be made from any metal (or any lightweight and/or heat-resistant material). The outer wall 304 encloses the inner wall 310. The cross sectional shape of each of the outer wall 304 and the inner wall 310 is a compound shape comprising a semi-circle attached to a top of a rectangle. An upper portion 302a of the thermal barrier 302 is semi-circular in shape and a lower portion 302b of the thermal barrier 302 is rectangular in shape. The outer wall 304 comprises an outer surface 306a and an inner surface 306b. The inner wall 310 comprises an outer surface 312a and an inner surface 312b. The outer surface 306a of the outer wall 304 is an outermost surface of the thermal barrier 302. The inner surface 312b of the inner wall 310 is an innermost surface of the thermal barrier 302. The inner wall 310 (and, in particular, the inner surface 312b) forms a cavity 316. The driveshaft 117 lies within the cavity 316. The outer wall 304 and the inner wall 310 are separated from one another by a space 308. The space 308 is a gap measuring a distance D2 between the outer surface 312a (of the inner wall 310) and the inner surface 306b (of the outer wall 304). In the example of FIG. 3B, the distance D2 is substantially constant around the entire cross-section of the thermal barrier 302. However, in other examples, the gap is not constant and, instead, varies about the thermal barrier 302 (e.g., the gap is wider on the sides that face the engines to provide more thermal protection in the potentially hottest zones of a fire).

The space 308 is evacuated and forms a vacuum. For example, substantially all air (and/or other gases) are removed from the space 308 to create a vacuum between the outer wall 304 and the inner wall 310. The vacuum within the space 308, at least in part, shields the driveshaft 117 from heat generated by a fire on one or more of the engines 113a and 113b. Advantageously, the shielding provided by the vacuum in the thermal barrier 302 allows the driveshaft 117 to continue to transmit torque (e.g., to a tail rotor system for keeping the rotorcraft airborne) regardless of the material from which the driveshaft 117 is made. For example, even when the driveshaft 117 is made from a material (e.g., composite materials, carbon fiber, aluminum, fiberglass, or any other non-steel material) that fails to transmit torque when exposed to high temperatures, the thermal barrier shields the driveshaft 117 from excessive heat produced by a fire on the engines 113a and 113b and allows the driveshaft 117 to continue to transmit torque during and after the fire.

The walls (i.e., the outer wall 304 and the inner wall 310) of the thermal barrier 302 can be made from any lightweight and heat-resistant material. In some embodiments, the walls of the thermal barrier 302 are titanium. In further embodiments, neither the inner wall 310 nor the outer wall 304 are made of steel (e.g., excludes steel due to the relatively high weight of steel relative to other materials). In still other embodiments the thermal barrier 302 excludes any metalized foam or thermal blankets (e.g., due to the relatively high thickness of metalized foam and thermal blankets relative to other materials).

In one exemplary operation of the thermal barrier 302, the outer surface 306a of the outer wall 304 receives a temperature of about 500° F. (i.e., a first temperature). The vacuum space 308 shields the cavity 316 and, as a result, also shields the driveshaft 117 (i.e., a drivetrain component enclosed in the cavity) from excessive temperatures. Instead, the inner surface 312b only receives a temperature of about 250° F. (i.e., a second temperature). In addition, the driveshaft 117 may be maintained at an even lower temperature because an air gap separates driveshaft 117 and inner surface 312b (see FIGS. 3B, 3C). Forced air movement in this gap may further protect driveshaft 117 from elevated temperatures. In this example, the walls 304 and 310 are made of titanium. The shielding provided by the vacuum space 308 provides a temperature reduction of about 50% (i.e., from the first temperature to the second temperature). In one non-limiting example, the gap is on the order of a few millimeters (e.g., the distance D1 is about 2 or 3 millimeters).

Turning to FIG. 3C, FIG. 3C illustrates a cross-section through an empennage of a rotorcraft protected by the thermal barrier 302. The viewpoint of the cross-section of FIG. 3C corresponds to the viewpoint of the cross-section of FIG. 1C (as depicted by the section lines in FIGS. 1A and 1B through the empennage 111 of the rotorcraft 101). The cross-section of FIG. 3C includes tailboom 128, driveshaft 117, hanger bearing assembly 126, and driveshaft cover 124 as described with respect to FIG. 1C; the description is not repeated here only for the purpose of brevity. In contrast to the cross-section of FIG. 1C, the cross-section of FIG. 3C includes the thermal barrier 302. In this example, thermal barrier 302 extends into the empennage. One or more tabs 314a and 314b are fastened to the outside of the thermal barrier 302. The thermal barrier 302 is supported by the tailboom 128 (via tabs 314a and 314b). The tabs 314a and 314b attach the thermal barrier 302 to the tailboom 128. Each of the tabs 314a and 314b is attached, at one end, to the thermal barrier 302 and, at the other end, to the tailboom 128. The attachment between the tabs and the thermal barrier 302 may be any mechanical attachment (e.g., welding, mechanical fastening, etc.). In some examples the tabs 314a and 314b are formed as part of (are continuous with and integral to) the outer wall 304. In other examples, a strap or ring wraps around the thermal barrier 302 (e.g., gripping the barrier) and the strap or ring is mechanically fastened to the tailboom 128 and/or other components of the airframe (e.g., to eliminate any need to weld or fastening directly to the thermal barrier). In addition, the thermal barrier 302 may be supported, at least in part, by the hanger bearing assembly (not shown). In this example, the thermal barrier 302 is a standalone part that is added to the rotorcraft. However, in other examples, the thermal barrier 302 may be integrated, at least in part, with the empennage.

Figure 4B:
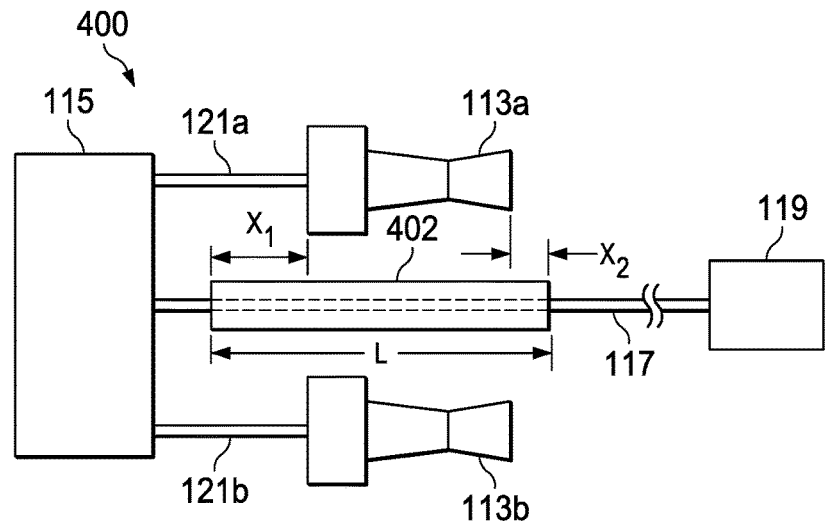
Figure 5:
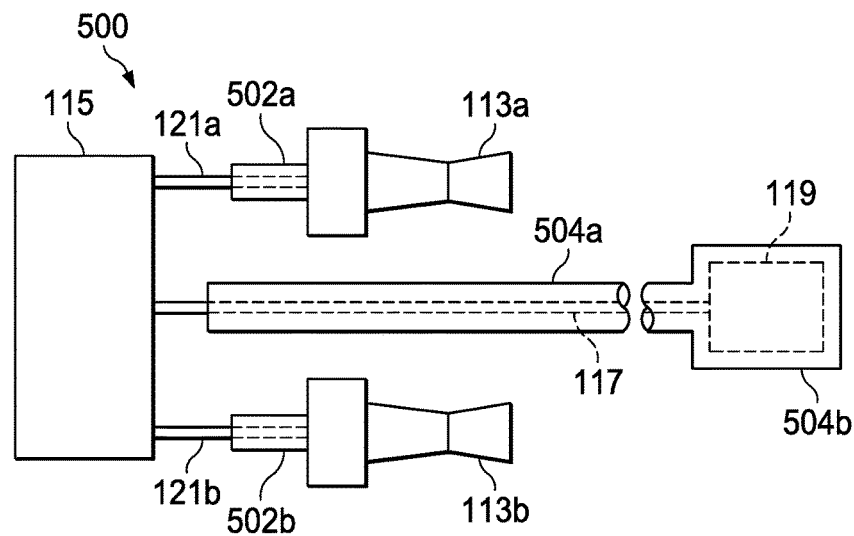

FIGS. 4A, 4B, and 5 illustrate simplified top views of rotorcraft with various configurations of thermal barriers in accordance with certain embodiments.

Each of FIGS. 4A, 4B, and 5 illustrate a top view of a drivetrain system of a rotorcraft, which includes at least one thermal barrier. Each of the systems 400 (FIGS. 4A and 4B) and 500 (FIG. 5) comprises engines 113a and 113b, driveshafts 121a and 121b, a main rotor gearbox 115, a tail rotor driveshaft 117, and a tail rotor gearbox 119, each of which is as described with respect to FIGS. 1A and 1B; the description of these components is not repeated here only for the purpose of brevity. It is noted that the thermal barriers described with respect to FIGS. 4A, 4B, and 5 may be any thermal barrier as disclosed herein (e.g., thermal barrier 202 of FIGS. 2A-C, thermal barrier 302 of FIGS. 3A-C, and any others as disclosed herein).

Turning to FIGS. 4A and 4B, FIGS. 4A and 4B illustrate a top view of a drivetrain system 400 of a rotorcraft, which includes a thermal barrier 402. The thermal barrier 402 surrounds a portion of the tail rotor driveshaft 117. The portion of the driveshaft 117 that is surrounded by the thermal barrier 402 is defined, at least in part, by a threshold distance measured to a source of heat and/or potential fire. In this, example, the portion of the driveshaft 117 that is surrounded by the thermal barrier 402 is defined, at least in part, by a threshold distance measured between extreme ends of the thermal barrier 402 and one or more of the engines 113a and 113b. The threshold distances are labeled X1 and X2 in FIGS. 4A and 4B. In each of the FIGS. 4A and 4B, a length of the thermal barrier 402 (i.e., labeled distance "L" in the figures) remains unchanged. Thus the length of the portion of the driveshaft 117 that is surrounded by the thermal barrier is equal to the distance L. In the examples of FIGS. 4A and 4B, the distance L is less than the total length of the driveshaft 117. However, in other examples (e.g., similar to that in FIG. 5) the thermal barrier can cover substantially the full length of the driveshaft 117 (e.g., the full length that is potentially exposed to fire). The location of that portion is determined based on the threshold distances X1 and X2. In the example of FIG. 4A, the distances X1 and X2 are approximately equal to one another. In the example of FIG. 4B, the distance X1 is greater than the distance X2. In other examples, the distance X2 is greater than the distance X1. In operation, the actual length of the barrier may be influenced by an engine inlet, an engine exhaust duct, and/or an airframe structure. For example, many rotorcraft have firewalls at the engine inlet, between the engines, and at an exhaust duct. These firewalls may be considered in designing a thermal barrier (e.g., extending or limiting distance L and/or the offset X1 and/or X2 of the thermal barrier 402 protecting the driveshaft 117).

Turning to FIG. 5, FIG. 5 illustrate a top view of a drivetrain system 500 of a rotorcraft, which includes a plurality of thermal barriers (i.e., driveshafts 502a, 502b, 504a, and 504b). Any component of the drivetrain system (or other mechanical or electrical systems) of a rotorcraft can be protected by a thermal barrier according to the present disclosure. The thermal barrier 502a surrounds (and protects) a portion of driveshaft 121a; the thermal barrier 502b surrounds (and protects) a portion of driveshaft 121b; the thermal barrier 504a surrounds (and protects) a portion of driveshaft 117 (i.e., in this case substantially all of the driveshaft 117); and the thermal barrier 504b surrounds (and protects) the gearbox 119. In other examples, a thermal barrier surrounds (and protects) the gearbox 115.

It is noted that the thermal barriers described within the present specification are not limited to protecting driveshaft components. The thermal barriers taught in the present disclosure can also protect non-drivetrain components (e.g., electrical systems, gas tanks, flight recorders (i.e., so-called "black boxes"), and/or other components). In addition, it is noted that the thermal barriers described within the present specification are not limited to aircraft. They may be applied to any system where heat and or fire may expose critical components to extreme temperatures. These components may be in any vehicle which operates in water, or air, on land, in space, or any combination thereof. FIGS. 6, 7, 8, 9, and 10 illustrate views of various vehicles protected by a thermal barrier in accordance with certain embodiments of the present disclosure.

Figure 6:
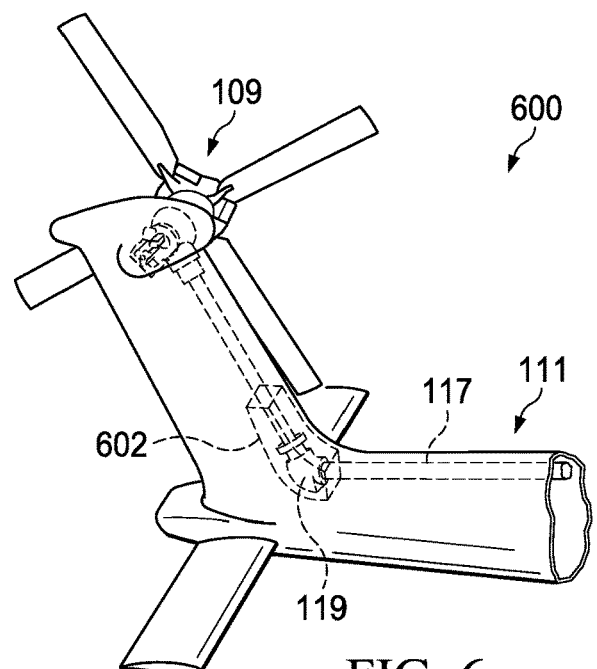
FIGS. 6, 7, 8, 9, and 10 illustrate various vehicles with drivetrain components protected by a thermal barrier in accordance with certain embodiments.

Turning to FIG. 6, FIG. 6 illustrates a portion of a rotorcraft tail assembly 600. The tail assembly 600 comprises, among other things, a gearbox 119, a tail rotor driveshaft 117, and an empennage 111. The tail rotor driveshaft 117 supplies torque (from an engine) to the gearbox 119. In this example, only the gearbox 119 is protected by a thermal barrier 602. The thermal barrier 602 is approximately rectangular in cross-sectional shape and follows a curve of the tail assembly 600 in the region of the gearbox 119. The shape of the thermal barrier 602 can conform to the shape of the gearbox and/or be offset from the shape of the gearbox 119.

Figure 7:
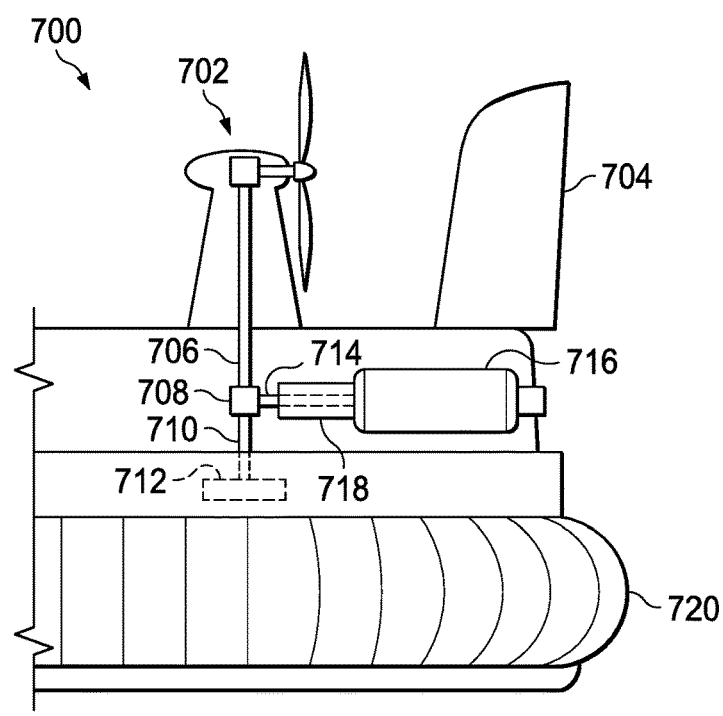

Turning to FIG. 7, FIG. 7 illustrates a portion of a hovercraft 700. The hovercraft 700 comprises a propeller 702, a rudder 704, an engine 716, a gearbox 708, a lift fan 712, driveshafts 706, 710, and 714, a skirt 720, and a thermal barrier 718. Torque generated by the engine 716 is transmitted to the driveshaft 714, which, in turn, transmits the torque to the gearbox 708. The gearbox 708 transmits torque to each of the driveshafts 706 and 710. The driveshaft 706 supplies torque to the propeller 702, which forces air past the rudder 704 and propels the hovercraft 702. The driveshaft 710 provides torque to the lift fan 712. The lift fan, when operated by torque supplied from the driveshaft 710, fills the skirt 702 with air, which raises the hovercraft 700. The thermal barrier 718 surrounds a portion of the driveshaft 714. In this example, a portion of driveshaft 714 is shielded by the thermal barrier 718 from any fire that may occur in the engine 716. In one example, the thermal barrier 718 is an implementation of the thermal barrier 202 of FIGS. 2A-C. In another example, the thermal barrier 718 is an implementation of the thermal barrier 302 of FIGS. 3A-C.

Figure 8:
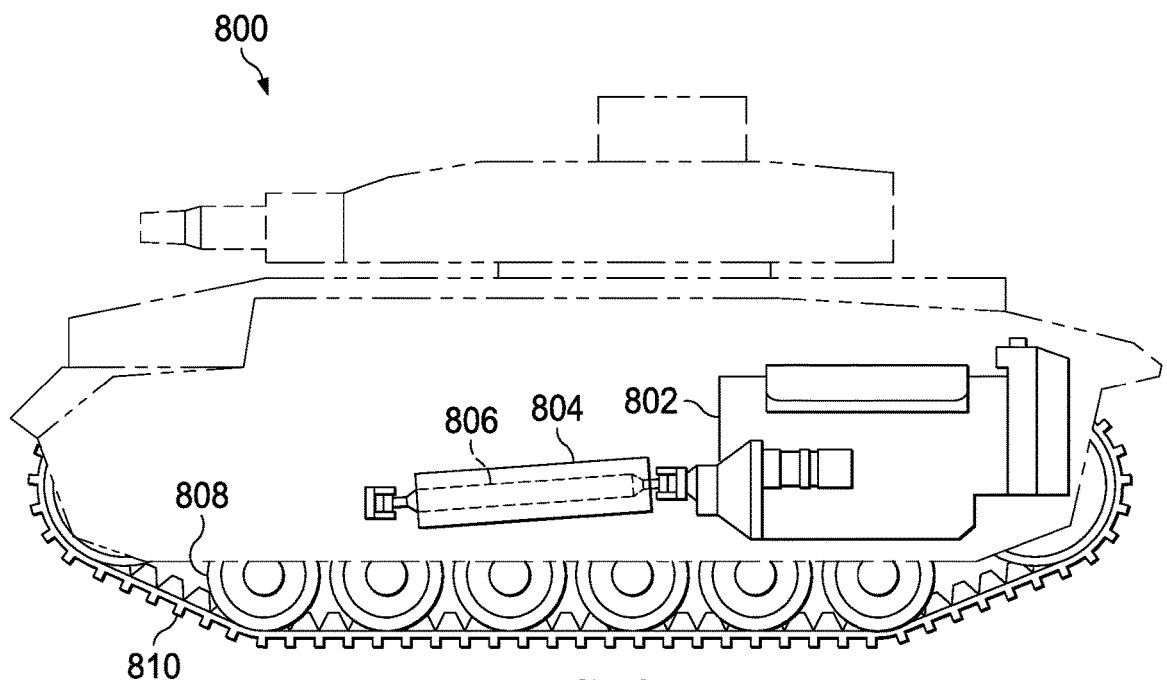

Turning to FIG. 8, FIG. 8 illustrates a tank 800. The tank 800 comprises, among other things, an engine 802, a driveshaft 806, wheels 808, track 810, and a thermal barrier 804. Torque generated by the engine 802 is transmitted to the driveshaft 804, which, ultimately, transmits the torque to the wheels 808 (i.e., turning the wheels 808). The wheels 808 transmit torque to the track 810, which can propel the tank forward and/or backward. The thermal barrier 804 surrounds a portion of the driveshaft 806. In this example, the portion of driveshaft 806 is shielded by the thermal barrier 804 from any fire that may occur in the engine 802 (and/or heat/fire within the cabin or exterior to the tank 800). In one example, the thermal barrier 802 is an implementation of the thermal barrier 202 of FIGS. 2A-C. In another example, the thermal barrier 802 is an implementation of the thermal barrier 302 of FIGS. 3A-C.

Figure 9:
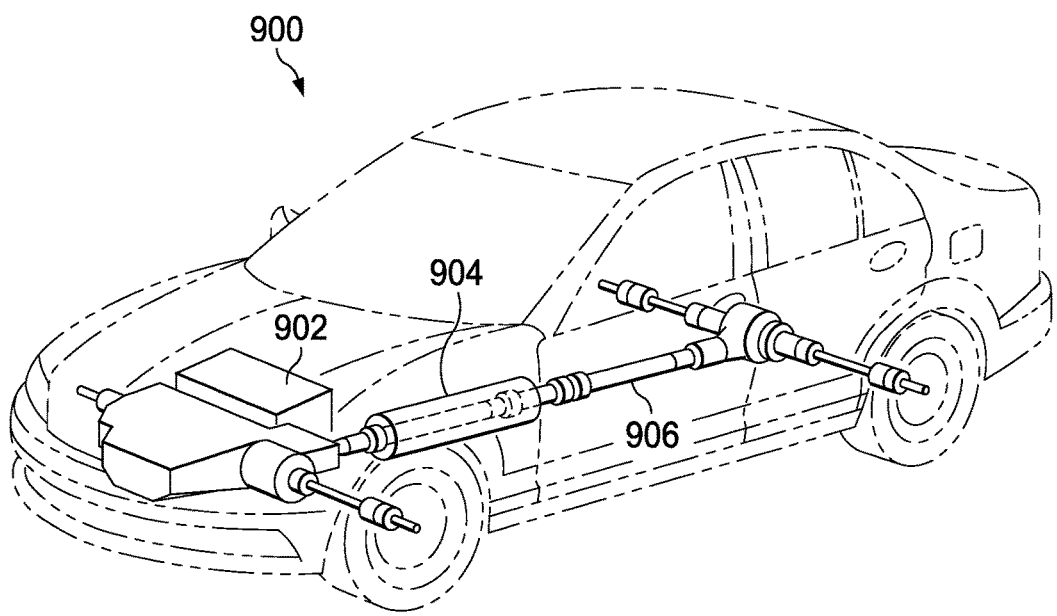

Turning to FIG. 9, FIG. 9 illustrates a car 900. The car 900 comprises, among other things, an engine 902, a driveshaft 906, and a thermal barrier 904. The thermal barrier 904 surrounds a portion of the driveshaft 906. Torque generated by the engine 902 is transmitted to the driveshaft 906, which, ultimately, transmits the torque to the wheels (i.e., turning the wheels to propel the car 900). In this example, a portion of driveshaft 906 is shielded by the thermal barrier 904 from any fire that may occur in the engine 902 (and/or heat/fire within the cabin or exterior to the car 900). In one example, the thermal barrier 904 is an implementation of the thermal barrier 202 of FIGS. 2A-C. In another example, the thermal barrier 904 is an implementation of the thermal barrier 302 of FIGS. 3A-C. For a ground vehicle, weight may not be as much of an issue and space restrictions and, thus, the walls of the thermal barrier 904 may be made of steel.

Figure 10:
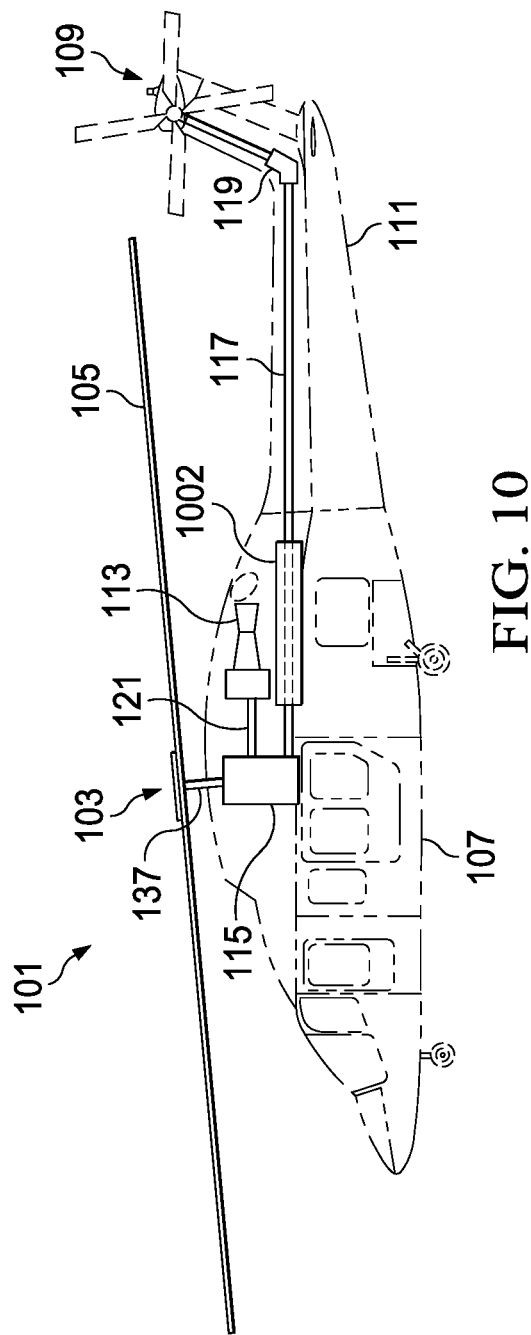

Turning to FIG. 10, FIG. 10 illustrates a single engine rotorcraft 101. The rotorcraft of FIG. 10 includes rotor system 103, a plurality of rotor blades 105, main rotor mast 137, a gearbox 115, a fuselage 107, and an empennage 111, a tail rotor driveshaft 117, and a gearbox 119, an anti-torque system 109, each of which is as described with respect to FIGS. 1A, 1B, and 1C; the description is not repeated here only for the purpose of brevity. In contrast to the rotorcraft of FIGS. 1A, 1B, and 1C, the rotorcraft FIG. 10 includes only a single engine 113 and a single engine main output driveshafts 121. In addition, the tail rotor driveshaft 117 runs under the single engine 113. In this example, a portion of tail rotor driveshaft 117 (which extends beneath the engine 113) is shielded by a thermal barrier 1002 from any fire that may occur in the engine 113. In one example, the thermal barrier 1002 is an implementation of the thermal barrier 202 of FIGS. 2A-C. In another example, the thermal barrier 904 is an implementation of the thermal barrier 302 of FIGS. 3A-C.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A rotorcraft comprising:
an engine;
a driveshaft operably coupled to the engine; and
an evacuated thermal barrier surrounding at least a portion of the driveshaft, the evacuated thermal barrier comprising a vacuum between an inside and an outside of the evacuated thermal barrier, wherein the evacuated thermal barrier is operable to:
receive, from a fire on the engine, a first temperature at the outside; and
receive a second temperature at the inside based on the vacuum shielding the first temperature from the inside and reducing temperature by at least 50% from the first temperature to the second temperature.

2. The rotorcraft of claim 1, wherein the evacuated thermal barrier comprises:
an inner wall forming a cavity in which the driveshaft lies,
an outer wall enclosing the inner wall, and
a space between the inner wall and the outer wall, wherein the space is evacuated and forms the vacuum.

3. The rotorcraft of claim 2, wherein the engine is located outside of the outer wall of the evacuated thermal barrier.

4. The rotorcraft of claim 1, further comprising:
a gearbox to supply torque from the engine to the driveshaft, wherein at least a portion of the evacuated thermal barrier surrounds the gearbox.

5. The rotorcraft of claim 2, wherein a shape of the evacuated thermal barrier comprises a cylinder shape.

6. The rotorcraft of claim 5, wherein a cross sectional shape of each of the inner wall and the outer wall comprises a circular shape, and a shape of the space comprises an annular shape.

7. The rotorcraft of claim 1, wherein a shape of the evacuated thermal barrier comprises a compound shape.

8. The rotorcraft of claim 7, wherein the compound shape comprises a semi-circular portion and a rectangular portion.

9. The rotorcraft of claim 1, wherein at least a portion of the evacuated thermal barrier is located within a threshold distance of the engine.

10. The rotorcraft of claim 1, wherein the threshold distance is determined by a location of a firewall.

11. The rotorcraft of claim 2, further comprising:
one or more tabs fastened to an outside surface of the outer wall, wherein each of the one or more tabs attach to an empennage of the rotorcraft.

12. The rotorcraft of claim 2, wherein each of the inner wall and the outer wall comprise a material selected from the group consisting of: titanium, aluminum, and steel.

13. The rotorcraft of claim 2, wherein the evacuated thermal barrier excludes metalized foam.

14. The rotorcraft of claim 1, wherein the driveshaft comprises a material that fails to transmit torque when heated to a temperature that exceeds about 400 degrees Celsius.

15. The rotorcraft of claim 14, wherein the material is one selected from the group consisting of: a composite material, carbon fiber, and aluminum.

16. An apparatus comprising:
a thermal barrier configured to surround at least a portion of a driveshaft and to protect the driveshaft from heat, wherein the thermal barrier comprises:
an inner wall forming a cavity configured to receive at least a portion of the driveshaft,
an outer wall enclosing the inner wall, and
a space between the inner wall and the outer wall, wherein the space is evacuated and forms a vacuum, wherein the thermal barrier is operable to:
receive, from a fire outside of the thermal barrier, a first temperature at the outer wall; and
receive a second temperature at the inner wall based on the vacuum shielding the first temperature from the inside and reducing temperature by at least 50% from the first temperature to the second temperature.

17. The apparatus of claim 16, wherein the thermal barrier is configured to protect the driveshaft from the fire on an engine.

18. The apparatus of claim 16, wherein a shape of the thermal barrier comprises a cylinder shape.

19. The apparatus of claim 16, wherein a cross sectional shape of each of the inner wall and the outer wall comprises a circular shape, and a shape of the space comprises an annular shape.

20. The apparatus of claim 16, wherein a shape of the thermal barrier comprises a compound shape.

* * * * *